United States Patent
Tateishi

(10) Patent No.: US 11,422,780 B2
(45) Date of Patent: Aug. 23, 2022

(54) AUTOMATICALLY EXTRACTING FEATURE ENGINEERING KNOWLEDGE FROM EXECUTION TRACES

(71) Applicant: INTERNATIONAL BUSINESS MACHINES CORPORATION, Armonk, NY (US)

(72) Inventor: Takaaki Tateishi, Yamato (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 435 days.

(21) Appl. No.: 16/752,191

(22) Filed: Jan. 24, 2020

(65) Prior Publication Data

US 2021/0232936 A1    Jul. 29, 2021

(51) Int. Cl.
| | |
|---|---|
| G06F 8/41 | (2018.01) |
| G06N 5/02 | (2006.01) |
| G06F 16/901 | (2019.01) |
| G06N 20/00 | (2019.01) |
| G06N 5/04 | (2006.01) |

(52) U.S. Cl.
CPC .......... *G06F 8/433* (2013.01); *G06F 16/9024* (2019.01); *G06N 5/022* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 5,889,999 | A | 3/1999 | Breternitz, Jr. et al. |
| 9,104,433 | B2 | 8/2015 | Inoue |
| 9,372,736 | B2 | 6/2016 | Curbera et al. |
| 10,067,853 | B2 | 9/2018 | Kumar |

(Continued)

OTHER PUBLICATIONS

Boujarwah et al., "Dynamic Data Flow Analysis for Java Programs", Elsevier, Information and Software Technology 42 (2000), Apr. 2000, pp. 765-775.

(Continued)

*Primary Examiner* — Qing Chen
(74) *Attorney, Agent, or Firm* — Tutunjian & Bitetto, P.C.; Joseph Petrokaitis

(57) ABSTRACT

A method is provided for creating a directed graph. The method obtains an execution trace having a sequence of invocations of table transformations. Each invocation is classified as a call-with-object invocation or call-with-column invocation. The call-with-object invocation indicates that an invoked function has object IDs as at least one of input and output information. The call-with-column invocation indicates that the invoked function has column names as the at least one of input and output information. The method processes the trace to build the graph. Each node indicates an object or a column and each edge indicates data flow. The method performs, in response to all invocations being processed, an automated graph reduction process by eliminating given nodes indicating a respective object such that that every two nodes that connect with each other, via a respective one of the given nodes as an intermediate node, can keep the connection therebetween.

20 Claims, 8 Drawing Sheets

(56) References Cited

U.S. PATENT DOCUMENTS

| | | | | |
|---|---|---|---|---|
| 2014/0101643 A1* | 4/2014 | Inoue | .................. | G06F 8/443 |
| | | | | 717/156 |
| 2015/0324241 A1* | 11/2015 | Curbera | .............. | G06F 11/3466 |
| | | | | 718/106 |
| 2017/0270026 A1* | 9/2017 | Kumar | .................. | G06F 8/53 |

OTHER PUBLICATIONS

Cain, "Dynamic Data Flow Analysis for Object Oriented Programs", Computer Science, Apr. 2005, pp. 1-138.

Nishimura, "State Elimination", CS360, Computer Science and Engineering, University of Washington, May 2014, 3 pages.

Paskevicius et al., "Automatic Extraction of Features and Generation of Feature Models from Java Programs", ISSN 1392—124X Information Technology and Control, Oct. 2012, 9 pages, vol. 41, No. 4.

* cited by examiner

```
import pandas as pd
import numpy as np df1 = pd.read_csv(...)
df1['ratio'] = df1['loan'] / df1['income']
df2 = pd.get_dummies(df1['gender'])
df3 = pd.concat([df1, df2], axis=1)
```

```
get('loan', obj01)
get('income', obj02)
callo('/', [obj01,obj02], obj03)
set('ratio', tbl01, obj03)
get('rank', obj11)
callc('get_dummies', ['rank'], ['F', 'M', 'NA'])
callc('concat', ['rank', 'F', 'M', 'NA'], [])
```

FIG. 7

AUTOMATICALLY EXTRACTING FEATURE ENGINEERING KNOWLEDGE FROM EXECUTION TRACES

BACKGROUND

The present invention generally relates to information processing, and more particularly to extracting feature engineering knowledge from execution traces. Feature engineering is the process of using domain knowledge of the data to create features that make machine learning algorithms work. Feature engineering is fundamental to the application of machine learning, and is both difficult and expensive. Thus, feature engineering is an important step in machine learning pipelines. An example of feature engineering can be table transformations. However, feature engineering requires domain knowledge which data scientists lack. Accordingly, there is a need for an approach for automatically extracting feature engineering knowledge from execution traces.

SUMMARY

According to an aspect of the present invention, a computer-implemented method is provided for creating and reducing a directed graph from an execution trace. The method includes obtaining, by a hardware processor, the execution trace having a sequence of invocations of table transformations. Each of the invocations is classified as a call-with-object invocation or as a call-with-column invocation. The call-with-object invocation indicates that an invoked function has object IDs as at least one of input and output information. The call-with-column invocation indicates that the invoked function has column names as the at least one of input and output information. The method further includes processing, by the hardware processor, the execution trace to build the directed graph. Each node in the directed graph indicates an object or a column and each edge indicates data flow. The method also includes performing, by the hardware processor in response to all the invocations being processed, an automated graph reduction process on the directed graph by eliminating from the directed graph given nodes indicating a respective object such that that every two nodes that connect with each other, via a respective one of the given nodes as an intermediate node, can keep the connection therebetween.

According to another aspect of the present invention, a computer program product is provided for creating and reducing a directed graph from an execution trace. The computer program product includes a non-transitory computer readable storage medium having program instructions embodied therewith. The program instructions are executable by a computer to cause the computer to perform a method. The method includes obtaining, by a hardware processor, the execution trace having a sequence of invocations of table transformations. Each of the invocations is classified as a call-with-object invocation or as a call-with-column invocation. The call-with-object invocation indicates that an invoked function has object IDs as at least one of input and output information. The call-with-column invocation indicates that the invoked function has column names as the at least one of input and output information. The method further includes processing, by the hardware processor, the execution trace to build the directed graph. Each node in the directed graph indicates an object or a column and each edge indicates data flow. The method also includes performing, by the hardware processor in response to all the invocations being processed, an automated graph reduction process on the directed graph by eliminating from the directed graph given nodes indicating a respective object such that that every two nodes that connect with each other, via a respective one of the given nodes as an intermediate node, can keep the connection therebetween.

According to yet another aspect of the present invention, a computer processing system is provided for determining command-to-process correspondence. The computer processing system includes a memory device including program code stored thereon. The computer processing system further includes a hardware processor, operatively coupled to the memory device, and configured to run the program code stored on the memory device to obtain the execution trace having a sequence of invocations of table transformations. Each of the invocations is classified as a call-with-object invocation or as a call-with-column invocation. The call-with-object invocation indicates that an invoked function has object IDs as at least one of input and output information. The call-with-column invocation indicates that the invoked function has column names as the at least one of input and output information. The hardware processor further runs the program code to process the execution trace to build the directed graph. Each node in the directed graph indicates an object or a column and each edge indicates data flow. The hardware processor also runs the program code to perform, in response to all the invocations being processed, an automated graph reduction process on the directed graph by eliminating from the directed graph given nodes indicating a respective object such that that every two nodes that connect with each other, via a respective one of the given nodes as an intermediate node, can keep the connection therebetween.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 6 is a diagram showing an exemplary python program, in accordance with an embodiment of the present invention;

FIG. 7 is a diagram showing an exemplary execution trace, in accordance with an embodiment of the present invention.

DETAILED DESCRIPTION

Embodiments of the present invention are directed to automatically extracting feature engineering knowledge from execution traces.

In one or more embodiment, feature engineering can be considered as table transformations. In one or more embodiments, feature engineering knowledge is extracted from execution traces by extracting relationships between columns and table transformations as a dependency graph by analyzing execution traces of machine learning programs. For example, if there are columns "income" and "loan", then the dependency graph can suggest the creation of a new column like "ratio", which can be the ratio of "loan" to "income". As another example, if there are columns "obstacles" and "accidents", then the dependency graph can suggest the creation of a new column like "ratio", which can the ratio of "obstacles" to "accidents".

In one or more embodiments, invocations (elements of an execution trace) are classified into four invocation types as follows: get; set; call-with-object; and call-with-column.

Figure 1:
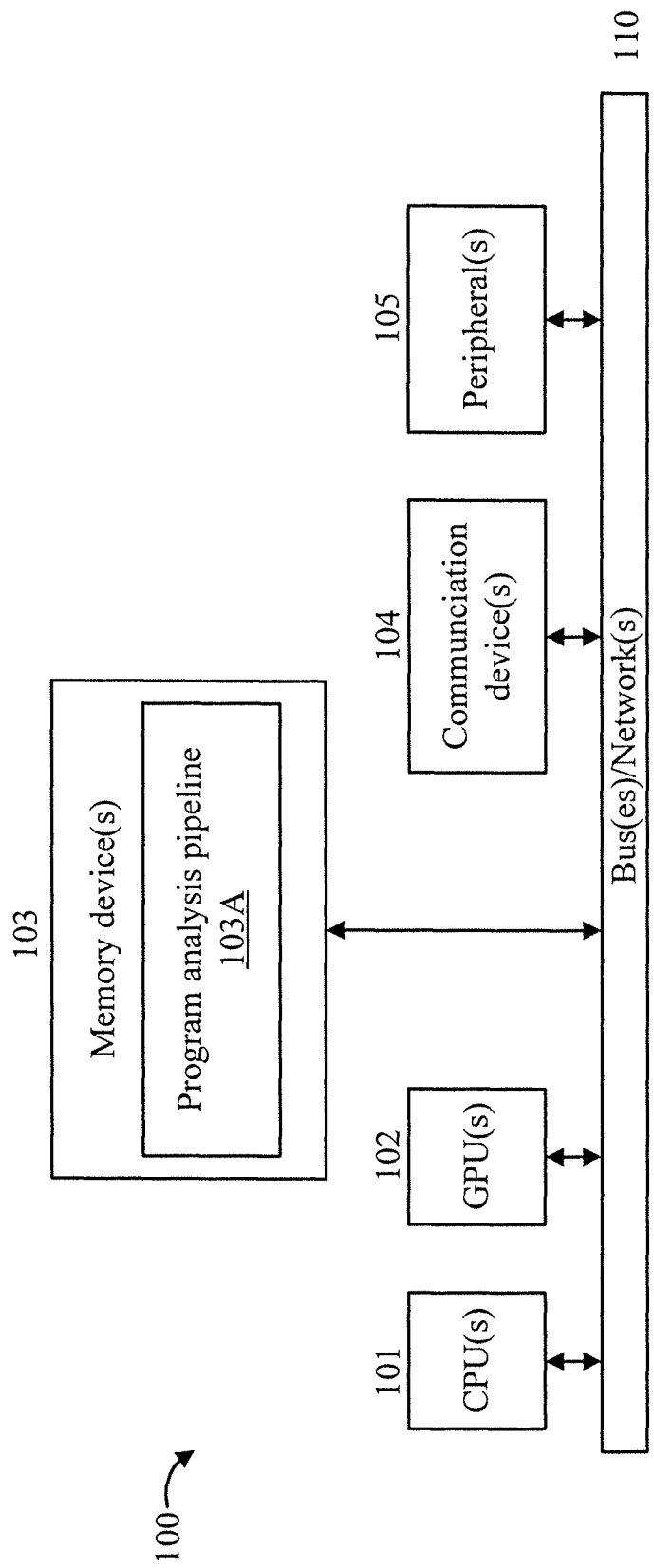
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embodiment, memory devices 103 can store a program analysis pipeline 103A for extracting feature engineering knowledge from execution traces to create and reduce a directed graph therefrom, in accordance with one or more embodiments of the present invention. In an embodiment, the program analysis pipeline 103A can be used to generate a directed graph from which a separate program or an engineer can make a machine learning pipeline.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

A description will now be given regarding the input to a method in accordance with an embodiment of the present invention.

In an embodiment, the input is an execution trace. Each trace is a sequence of invocations of table transformations.

Each invocation can be represented in one of the following forms where "name" is a column name, "obj" is an object ID, "f" is the name of a table transformation, "icols" and "ocols" are lists of (input and output) column names, "iobjs" and "oobjs" are lists of (input and output) object IDs.
get(name, obj)-get a column object "obj" named "name"
set(name, tbl, obj)-add a column object "obj" named "name" to a table object "tbl"
callo(f, iobjs, oobjs)-call "f" with objects "iobjs" and obtain objects "objs"
callc(f, icols, ocols)-call "f" with columns "icols" and obtain newly created columns "ocols"

In an embodiment, the output is a directed graph (N, E), where
N (Node set) is a union set of N' (names of columns including constants and table transformations), In, Out (input locations and output locations of calling table transformations), and
E is a set of edges between nodes.

Figure 2:
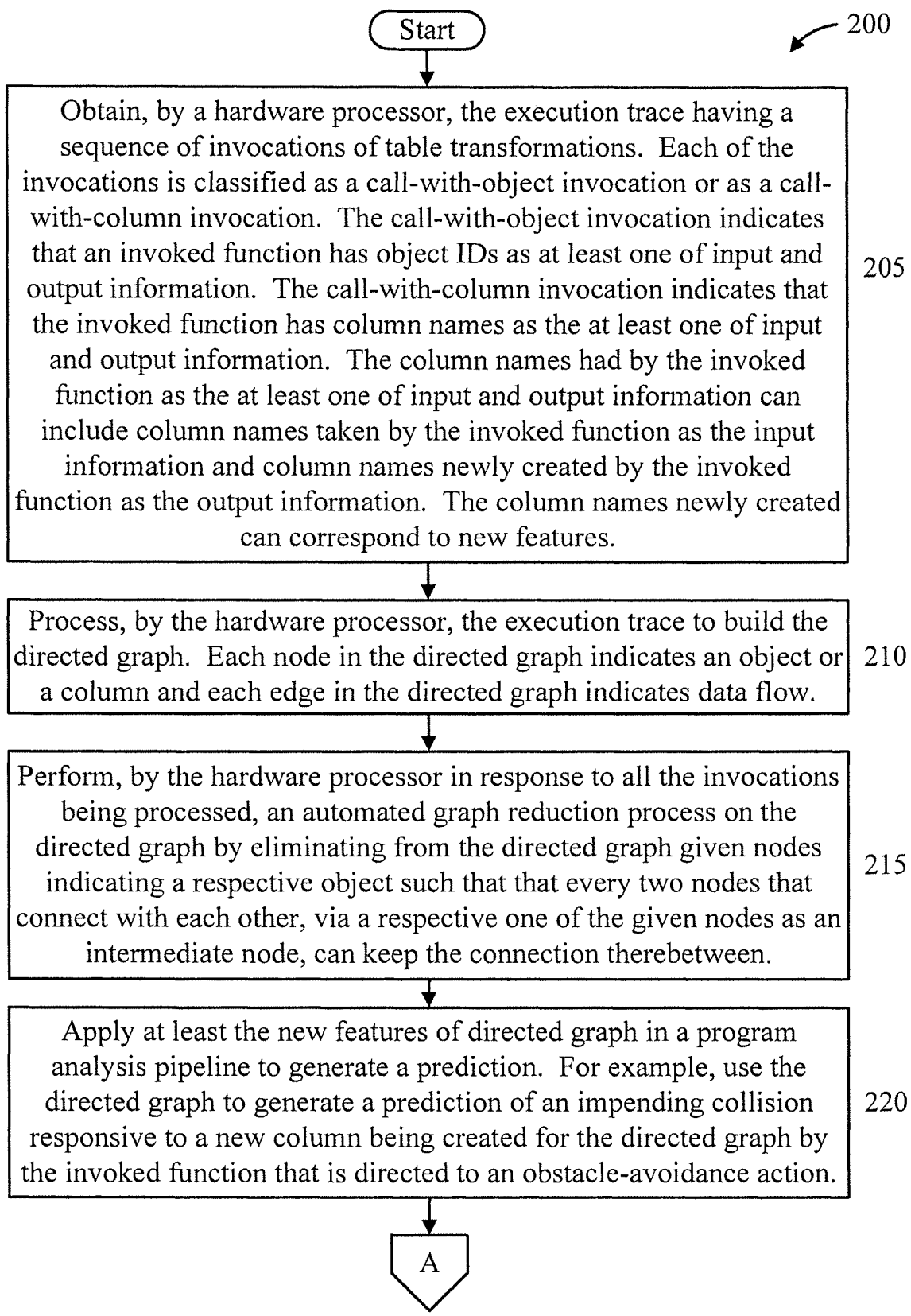
FIGS. 2-3 are flow diagrams showing an exemplary method for automatically extracting feature engineering knowledge from execution traces, in accordance with an embodiment of the present invention.
Figure 3:
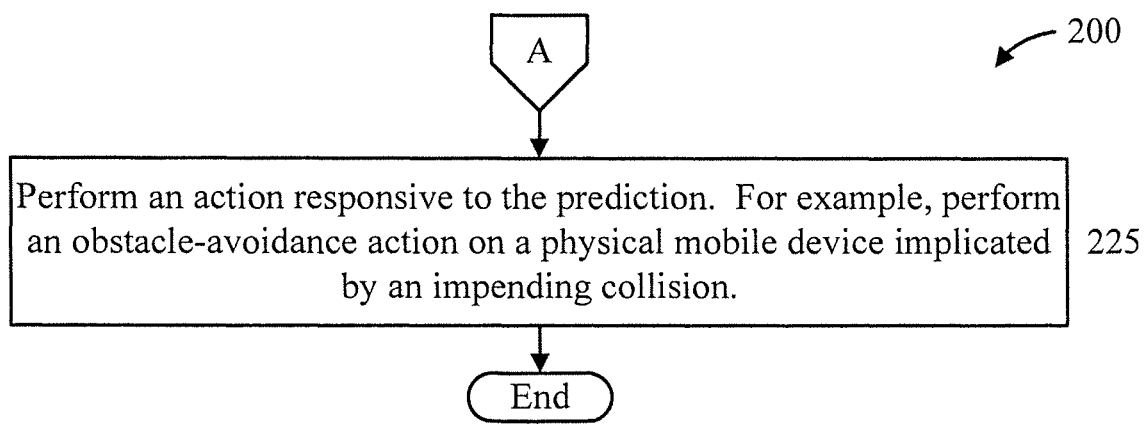

FIGS. 2-3 is a flow diagram showing an exemplary method 200 for automatically extracting feature engineering knowledge from execution traces, in accordance with an embodiment of the present invention.

At block 205, obtain, by a hardware processor, the execution trace having a sequence of invocations of table transformations. Each of the invocations is classified as a call-with-object invocation or as a call-with-column invocation.

The call-with-object invocation indicates that an invoked function has object IDs as at least one of input and output information. The call-with-column invocation indicates that the invoked function has column names as the at least one of input and output information. In an embodiment, the column names had by the invoked function as the at least one of input and output information can include column names taken by the invoked function as the input information and column names newly created by the invoked function as the output information. In an embodiment, the column names newly created can correspond to new features.

Figure 4:
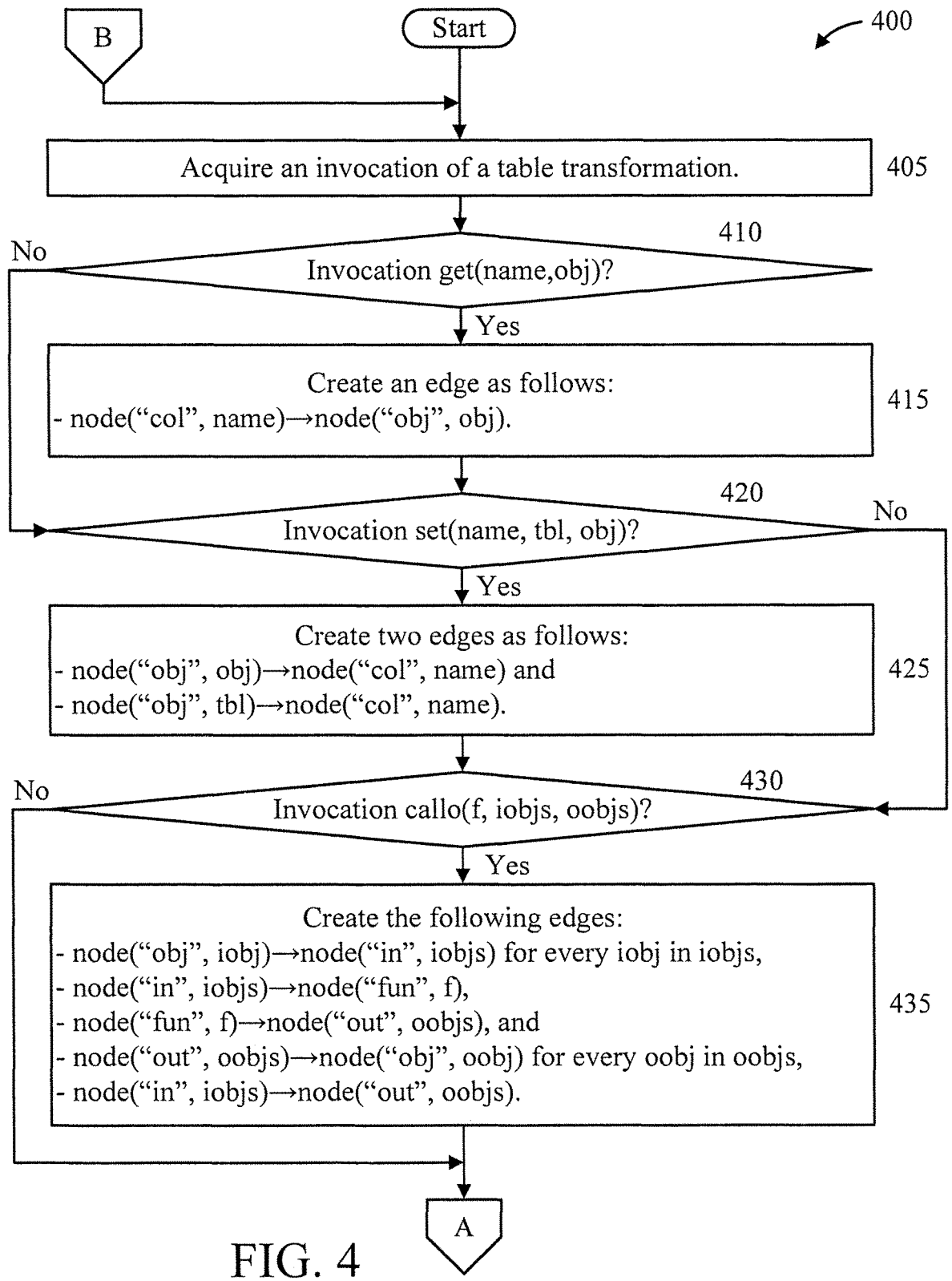
FIGS. 4-5 are flow diagrams showing an exemplary method for building a directed graph from an execution trace, in accordance with an embodiment of the present invention.

At block 210, process, by the hardware processor, the execution trace to build the directed graph. Each node in the directed graph indicates an object or a column and each edge in the directed graph indicates data flow. FIGS. 3-4 below further described block 210.

At block 215, perform, by the hardware processor in response to all the invocations being processed, an automated graph reduction process on the directed graph by eliminating from the directed graph given nodes indicating a respective object such that that every two nodes that connect with each other, via a respective one of the given nodes as an intermediate node, can keep the connection therebetween. Thus, the graph reduction method reduces the graph by deleting nodes directed to iobjs and oobjs that are intermediate nodes to any two given nodes such that the connection that existed before indirectly through the intermediate node is transformed into a direct connection between the two given nodes.

At block 220, apply at least the new features of directed graph in a program analysis pipeline to generate a prediction. For example, use the directed graph to generate a prediction of an impending collision responsive to a new column being created for the directed graph by the invoked function that is directed to an obstacle-avoidance action.

At block 225, perform an action responsive to the prediction. For example, perform an obstacle-avoidance action on a physical mobile device implicated by an impending collision.

Figure 5:
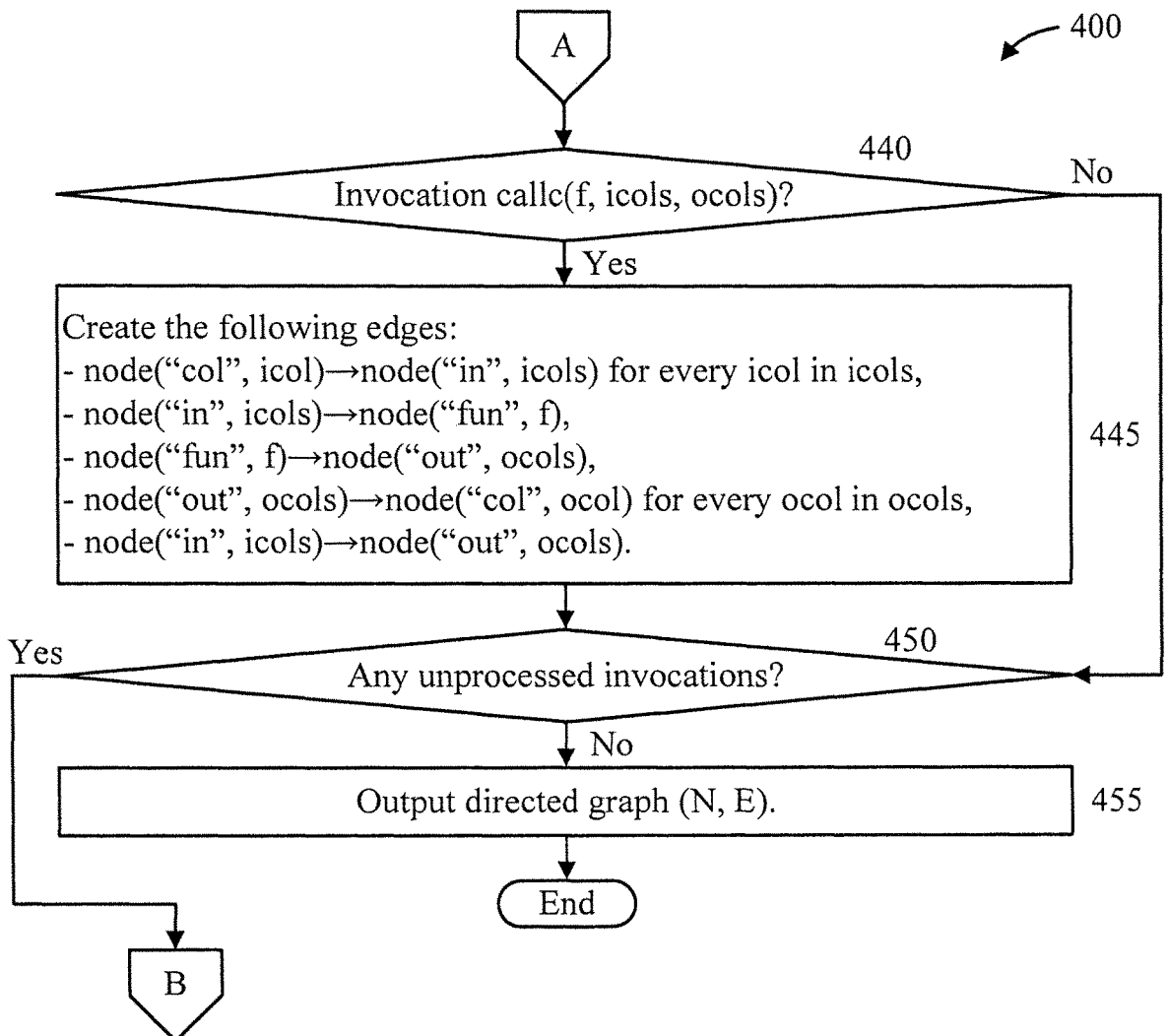

FIGS. 4-5 are flow diagrams showing an exemplary method 400 for building a directed graph from an execution trace, in accordance with an embodiment of the present invention.

The present invention iterates over the following steps over invocations in the given trace to build a directed graph where we use the notation "node(type, label)" for a node which is typed with "type" and labeled with "label" and the notation "node(t1,11)→node(t2,12)" for an edge. Method 400 can be considered to show block 210 of method 200, in accordance with an embodiment of the present invention.

At block 405, acquire an invocation of a table transformation.

At block 410, determine if the invocation is get(name, obj). If so, then proceed to block 415. Otherwise, proceed to block 420.

At block 415, create an edge as follows:
node("col", name)→node("obj", obj).

At block 420, determine if the invocation is set(name, tbl, obj). If so, then proceed to block 425. Otherwise, proceed to block 430.

At block 425, create two edges as follows:
node("obj", obj)→node("col", name) and
node("obj", tbl)→node("col", name).

At block 430, determine if the invocation is callo(f, iobjs, oobjs). If so, then proceed to block 435. Otherwise, proceed to block 440.

At block 435, create the following edges:
node("obj", iobj)→node("in", iobjs) for every iobj in iobjs,
node("in", iobjs)→node("fun", f),
node("fun", f)→node("out", oobjs), and
node("out", oobjs)→node("obj", oobj) for every oobj in oobjs,
node("in", iobjs)→node("out", oobjs).

At block 450, determine if the invocation is callc(f, icols, ocols). If so, then proceed to block 455. Otherwise, proceed to block 460.

At block 455, create the following edges:
node("col", icol)→node("in", icols) for every icol in icols,
node("in", icols)→node("fun", f),
node("fun", f)→node("out", ocols),
node("out", ocols)→node("col", ocol) for every ocol in ocols,
node("in", icols)→node("out", ocols).

At block 460, determine if there are any unprocessed invocations. If so, then return to block 410. Otherwise, proceed to block 465.

At block 465, output directed graph (N, E).

FIG. 6 is a diagram showing an exemplary python program 600, in accordance with an embodiment of the present invention. An execution trace can be generated for the program 600 (per FIG. 7), from which a directed dependency graph can be created (per FIG. 8).

FIG. 7 is a diagram showing an exemplary execution trace 700, in accordance with an embodiment of the present invention. The execution trace 700 is generated from the python program 600 of FIG. 6.

Figure 8:
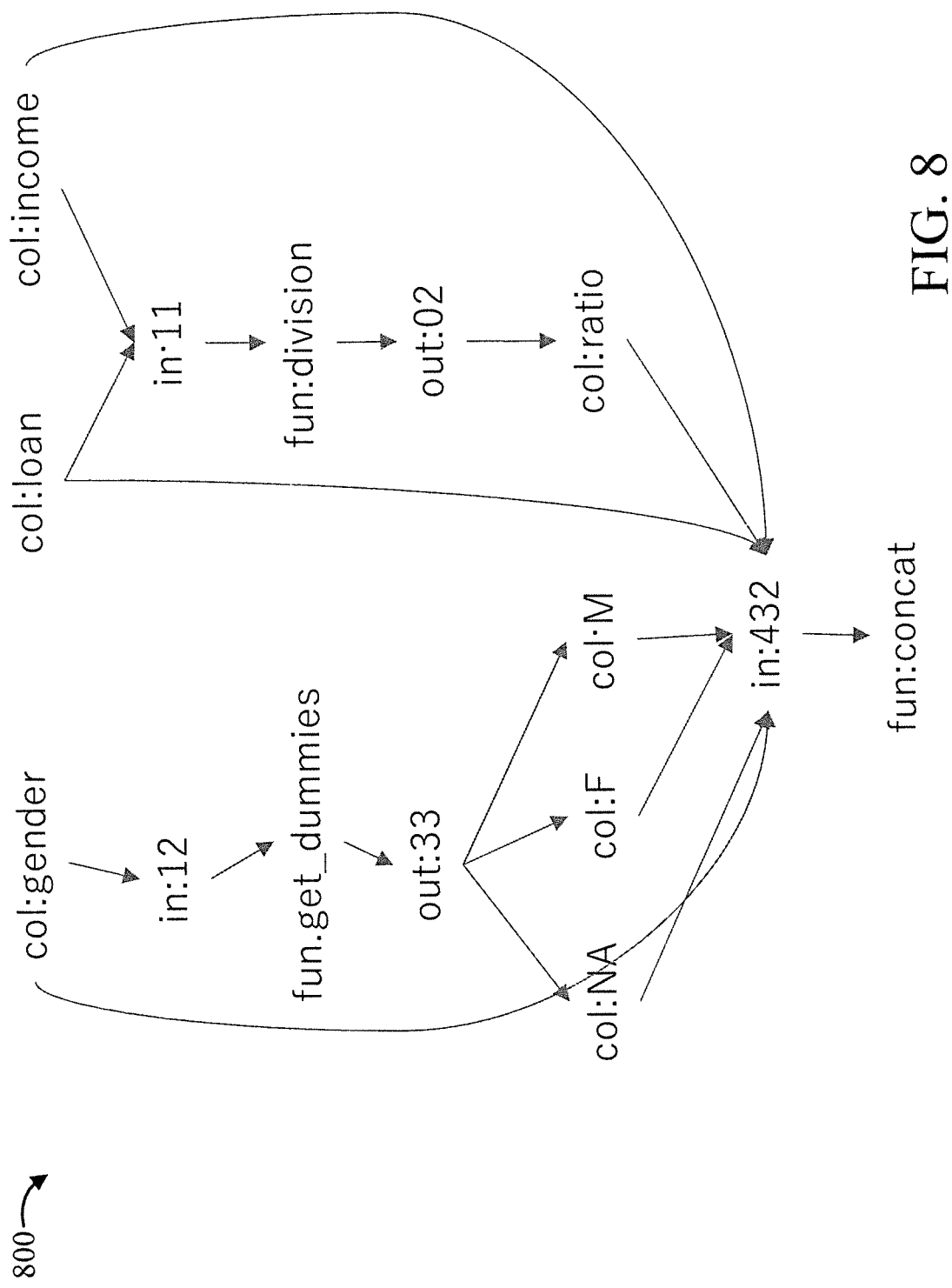
FIG. 8 is a diagram showing an exemplary dependency graph, in accordance with an embodiment of the present invention.

FIG. 8 is a diagram showing an exemplary dependency graph 800, in accordance with an embodiment of the present invention. The dependency graph 800 is generated from the execution trace 700 of FIG. 7. The dependency graph 800 includes the following columns: gender; loan; NA (Not Applicable); F (Female); M (Male); and ratio (loan/income). The dependency graph includes the following functions (fun): "get_dummies"; "division"; and "concat" (concatenation). The dependency graph includes the following input values: 12; 11; 33; 02; and 432. The dependency graph includes the following output values: 33; and 02.

Given that there is a program df["ratio"]=df["loan"]/df["income"] and its execution trace as follows
get('loan', obj01)
get('income', obj02)
callo('/', [obj01,obj02], obj03)
set('ratio', tbl01, obj03),
we can obtain the dependency graph in FIG. 8 by analyzing the execution trace using the claimed method. On the dependency graph, the path from the nodes "col:income" and "col:loan" to the node "col:ratio" via the node "fun: division", which represents that the ratio column can be computed from the income column and the loan column.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for creating and reducing a directed graph from an execution trace, comprising:
    obtaining, by a hardware processor, the execution trace having a sequence of invocations of table transformations, wherein each invocation of the sequence of invocations is classified as a call-with-object invocation or as a call-with-column invocation, and wherein the call-with-object invocation indicates that an invoked function has object IDs as at least one of input and output information and the call-with-column invocation indicates that the invoked function has column names as the at least one of input and output information;
    processing, by the hardware processor, the execution trace to build the directed graph, wherein each node in the directed graph indicates an object or a column and each edge in the directed graph indicates data flow; and
    executing, by the hardware processor in response to all the invocations of the sequence of invocations being processed, an automated graph reduction process on the directed graph by eliminating from the directed graph given nodes indicating a respective object such that that every two nodes that connect with each other, via a respective node of the given nodes as an intermediate node, can keep a connection therebetween.

2. The computer-implemented method of claim 1, wherein the column names had by the invoked function as the at least one of input and output information comprise column names taken by the invoked function as the input information and column names newly created by the invoked function as the output information.

3. The computer-implemented method of claim 2, wherein the column names newly created by the invoked function comprise new features, and the computer-implemented method further comprises applying the new features in a machine learning pipeline to generate a prediction.

4. The computer-implemented method of claim 1, wherein, in responsive to a particular invocation, from among the sequence of invocations being processed, being a call-with-column invocation, the processing of the execution trace to build the directed graph comprises (i) creating a new node labeled with a column and input and output columns, (ii) connecting the new node with another node, and (iii) labelling an edge between the new node and the other node with a function name.

5. The computer-implemented method of claim 1, wherein, in responsive to a particular invocation, from among the sequence of invocations being processed, being a call-with-object invocation, the processing of the execution trace to build the directed graph comprises (i) creating a new node labeled with a particular object and input and output object IDs, (ii) connecting the new node with another node, and (iii) labelling an edge between the new node and the other node with a function name.

6. The computer-implemented method of claim 1, further comprising:
    using the directed graph to generate a prediction of an impending collision responsive to a new column being created for the directed graph by the invoked function that is directed to an obstacle-avoidance action; and
    performing the obstacle-avoidance action on a physical mobile device implicated by the impending collision.

7. The computer-implemented method of claim 1, wherein nodes in the directed graph have a type selected from the group consisting of (i) a get type, (ii) a set type, (iii) a call-with-objects type, and (iv) a call-with-columns type.

8. The computer-implemented method of claim 7, wherein the get type gets a column object.

9. The computer-implemented method of claim 7, wherein the set type adds a column object to a table object.

10. The computer-implemented method of claim 7, wherein the call-with-objects type calls the invoked function with input objects and obtains output objects.

11. The computer-implemented method of claim 7, wherein the call-with-columns type calls the invoked function with input columns and obtains new output columns type.

12. The computer-implemented method of claim 1, further comprising feeding the directed graph into a program analysis pipeline to generate a prediction.

13. A computer program product for creating and reducing a directed graph from an execution trace, the computer program product comprising a non-transitory computer readable storage medium having program instructions embodied therewith, the program instructions executable by a computer to cause the computer to perform a method comprising:
    obtaining, by a hardware processor, the execution trace having a sequence of invocations of table transformations, wherein each invocation of the sequence of invocations is classified as a call-with-object invocation or as a call-with-column invocation, and wherein the call-with-object invocation indicates that an invoked function has object IDs as at least one of input and output information and the call-with-column invocation indicates that the invoked function has column names as the at least one of input and output information;
    processing, by the hardware processor, the execution trace to build the directed graph, wherein each node in the directed graph indicates an object or a column and each edge in the directed graph indicates data flow; and
    executing, by the hardware processor in response to all the invocations of the sequence of invocations being processed, an automated graph reduction process on the directed graph by eliminating from the directed graph given nodes indicating a respective object such that that every two nodes that connect with each other, via a respective node of the given nodes as an intermediate node, can keep a connection therebetween.

14. The computer program product of claim 13, wherein the column names had by the invoked function as the at least one of input and output information comprise column names taken by the invoked function as the input information and column names newly created by the invoked function as the output information.

15. The computer program product of claim 14, wherein the column names newly created by the invoked function comprise new features, and the method further comprises applying the new features in a machine learning pipeline to generate a prediction.

16. The computer program product of claim 13, wherein, in responsive to a particular invocation, from among the sequence of invocations being processed, being a call-with-column invocation, the processing of the execution trace to build the directed graph comprises (i) creating a new node labeled with a column and input and output columns, (ii) connecting the new node with another node, and (iii) labelling an edge between the new node and the other node with a function name.

17. The computer program product of claim 13, wherein, in responsive to a particular invocation, from among the sequence of invocations being processed, being a call-with-object invocation, the processing of the execution trace to build the directed graph comprises (i) creating a new node labeled with a particular object and input and output object IDs, (ii) connecting the new node with another node, and (iii) labelling an edge between the new node and the other node with a function name.

18. The computer program product of claim 13, wherein the method further comprises:
using the directed graph to generate a prediction of an impending collision responsive to a new column being created for the directed graph by the invoked function that is directed to an obstacle-avoidance action; and
performing the obstacle-avoidance action on a physical mobile device implicated by the impending collision.

19. The computer program product of claim 13, wherein nodes in the directed graph have a type selected from the group consisting of (i) a get type, (ii) a set type, (iii) a call-with-objects type, and (iv) a call-with-columns type.

20. A computer processing system for creating and reducing a directed graph from an execution trace, comprising:
a memory device including program code stored thereon; and
a hardware processor, operatively coupled to the memory device, and configured to run the program code stored on the memory device to:
obtain the execution trace having a sequence of invocations of table transformations, wherein each invocation of the sequence of invocations is classified as a call-with-object invocation or as a call-with-column invocation, and wherein the call-with-object invocation indicates that an invoked function has object IDs as at least one of input and output information and the call-with-column invocation indicates that the invoked function has column names as the at least one of input and output information;
process the execution trace to build the directed graph, wherein each node in the directed graph indicates an object or a column and each edge in the directed graph indicates data flow; and
execute, in response to all the invocations of the sequence of invocations being processed, an automated graph reduction process on the directed graph by eliminating from the directed graph given nodes indicating a respective object such that that every two nodes that connect with each other, via a respective node of the given nodes as an intermediate node, can keep a connection therebetween.

* * * * *